US011059140B2

(12) United States Patent
Buenaventura

(10) Patent No.: US 11,059,140 B2
(45) Date of Patent: Jul. 13, 2021

(54) FLEXIBLE DEBRIS SHIELD FOR HANDHELD DRILLS

(71) Applicant: Dynamic Security Consultations and Services, Hayward, CA (US)

(72) Inventor: Bryan Buenaventura, San Mateo, CA (US)

(73) Assignee: Spider Security Products, Hayward, CA (US)

( * ) Notice: Subject to any disclaimer, the term of this patent is extended or adjusted under 35 U.S.C. 154(b) by 0 days.

(21) Appl. No.: 16/510,266

(22) Filed: Jul. 12, 2019

(65) Prior Publication Data

US 2020/0016711 A1  Jan. 16, 2020

Related U.S. Application Data

(60) Provisional application No. 62/698,847, filed on Jul. 16, 2018.

(51) Int. Cl.
*B23Q 11/00* (2006.01)

(52) U.S. Cl.
CPC .... *B23Q 11/0071* (2013.01); *B23B 2260/058* (2013.01); *B23B 2270/30* (2013.01)

(58) Field of Classification Search
CPC . B23Q 11/0071; B23B 2270/30; B23B 47/34; B23B 2265/32; B23B 2260/058; B23B 2240/32; B23B 2240/36; B23B 2240/00; B23B 2270/06; B23B 2270/08; Y10T 408/50; B23C 2270/06; B23C 2270/08; B23C 2265/32; E21B 21/015
See application file for complete search history.

(56) References Cited

U.S. PATENT DOCUMENTS

| | | | | |
|---|---|---|---|---|
| 1,131,009 A * | 3/1915 | Bylander | ............... | E21B 21/015 |
| | | | | 175/209 |
| 1,981,570 A * | 11/1934 | Price | ..................... | E21B 21/015 |
| | | | | 175/211 |
| 3,583,821 A * | 6/1971 | Shaub | ................. | B23Q 11/0053 |
| | | | | 408/72 R |
| 6,332,734 B1 * | 12/2001 | Hebert | ................... | B23B 31/202 |
| | | | | 242/578.1 |
| 6,457,915 B1 * | 10/2002 | Kao | ......................... | B23B 51/05 |
| | | | | 408/204 |
| 9,452,502 B1 * | 9/2016 | Jones | ....................... | B23B 47/34 |
| 2004/0141820 A1 * | 7/2004 | Mikon | ............... | B23Q 11/0053 |
| | | | | 408/67 |
| 2006/0147284 A1 * | 7/2006 | Kim | .................... | B23Q 11/0042 |
| | | | | 408/68 |

(Continued)

FOREIGN PATENT DOCUMENTS

| | | | | |
|---|---|---|---|---|
| DE | 7802764 U1 * | 5/1978 | ......... | B23Q 11/0053 |
| DE | 2800368 A  * | 7/1979 | | |

(Continued)

*Primary Examiner* — Ryan C Rufo
(74) *Attorney, Agent, or Firm* — Indrajana Law Group, a PLC

(57) ABSTRACT

A flexible debris shield for handheld power drills for collecting debris generated while cutting or drilling holes in a work surface. The debris shield is made from a transparent flexible material in a way that it allows the debris receptacle to fold and envelop an uneven surface or in cases where the intended workspace area's width is narrower than the diameter of the shield.

8 Claims, 16 Drawing Sheets

(56) References Cited

U.S. PATENT DOCUMENTS

| | | | | |
|---|---|---|---|---|
| 2007/0065242 A1* | 3/2007 | Skradski | ............ | B23Q 11/0046 |
| | | | | 408/67 |
| 2008/0283302 A1* | 11/2008 | Larsson | ................ | E21B 21/01 |
| | | | | 175/209 |
| 2011/0008117 A1* | 1/2011 | Kasuya | ................ | B25D 16/00 |
| | | | | 408/67 |
| 2012/0308320 A1* | 12/2012 | Tseng | ................ | B23Q 11/0053 |
| | | | | 408/67 |
| 2015/0139741 A1* | 5/2015 | Chiappone | .............. | E21B 10/26 |
| | | | | 405/259.1 |
| 2018/0043490 A1* | 2/2018 | Johnson | ................ | A47L 7/0095 |

FOREIGN PATENT DOCUMENTS

| | | | | | |
|---|---|---|---|---|---|
| DE | 102007007890 A1 | * | 8/2008 | ......... | B23B 31/1177 |
| JP | 2000354935 A | * | 12/2000 | | |
| JP | 2004243693 A | * | 9/2004 | | |
| JP | 2008006577 A | * | 1/2008 | | |
| WO | WO-2011054988 A2 | * | 5/2011 | ......... | B23Q 11/0071 |

\* cited by examiner

FLEXIBLE DEBRIS SHIELD FOR HANDHELD DRILLS

CROSS REFERENCE TO RELATED APPLICATIONS

This Non-Provisional Application claims priority to U.S. Provisional Patent Application No. 62/698,847 having filing date of Jul. 16, 2018.

STATEMENT REGARDING FEDERALLY SPONSORED RESEARCH AND DEVELOPMENT

None.

FIELD OF THE INVENTION

The present invention relates to a flexible attachable debris shield for handheld drills to protect the user from shrapnel and/or debris produced from the hole being drilled.

BACKGROUND OF INVENTION

The present invention generally relates to rotary tools or machine that generate debris when working on a surface, such as drilling, cutting or sanding, and more particularly relates to accessory attachments which collect debris generated by such tools or machines.

Holes are typically cut in walls, ceilings, and other surfaces using a hand-operated drill with cutting or drilling attachments, such as hole saws, drill bits, and spade bits having a cutting or drill end and an arbor end with a polygonal cross-section which can be gripped by a drill chuck.

Because drills and other hole-cutting tools produce dust and debris during the drilling or cutting operation, shields have been designed to fit onto the drill for collecting the dust and debris as it is being generated. This is especially a problem when drilling on a ceiling because the debris will fall directly to the person's face and depending on the type of the debris the person can suffer small cuts and lacerations from the debris dropping from the ceiling. Typically, these collectors use a bellows debris receptacle which can flex in the axial direction as the drill or cutting tool advances into the cutting surface. One such collector is disclosed in U.S. Pat. No. 5,653,561, issued to Robert May, which discloses a bellows-shaped rubber boot that fits over the end of the drill behind the drill's rotating chuck. The boot is provided with a rubber outlet tube integrally formed in the side of the boot to which a vacuum can be connected. Other than by breaking the seal between the boot and the work surface, the boot disclosed in the May patent provides no facility for air intake or for providing air flow through the boot. The lack of air intake prevents the boot from being efficiently evacuated on a continuous basis as the cutting implement advances through the work surface.

U.S. Pat. No. 4,921,375, to Giovanni Famulari discloses a similar bellows-type collector. The Famulari collector is fitted to the frame of a drill and is provided with a relatively complicated internal impeller mechanism for moving collected debris into a collection bag. In Famulari, some air intake is provided for at the rim of the bellows by small holes around the circumference of the rim that can be easily clogged and that have no adjustment capability. In both May and Famulari, the collector bellows is designed to be an extension of the drill housing and does not provide for the accommodation of different types and sizes of tools.

U.S. Pat. No. 7,901,164 to Thomas J. Skradski et al. discloses a debris shield that includes a vacuum port and vent assembly to allow an external vacuum attachment to remove the collected debris present inside the shield.

However, all the implementations of debris shield in the current state of the art requires a flat working surface that allows complete seal between the lip of the debris shield and the working surface. This limitation effectively prevents using a debris shield effectively when the working surface area is narrower than the diameter of the debris shield, which may occur when a person needs to drill a hole at the end corner of a wall or a relatively narrow door frame. Thus, a need exists for an improved debris shield that can create a proper seal on a working surface that is not necessarily flat or narrower than the debris shield's diameter.

SUMMARY OF THE INVENTION

A flexible debris shield for handheld drills for collecting debris generated while cutting or drilling holes in a work surface. The debris shield is made from a flexible material in a way that it allows the shield to fold and envelop an uneven surface or in cases where the intended workspace area's width is narrower than the diameter of the shield. The flexible debris shield is attached to a handheld drill and secured by inserting the flexible debris shield into the drill bit and attaching the drill bit into the handheld drill.

The flexible debris shield comprises of a debris receptacle portion, with the debris receptacle having an outer lip that creates a seal when compressed to a working surface, a drill shank aperture where a drill bit can be inserted and secure the debris shield to a hand-held drill. The debris receptacle portion has an outer wall portion, and an inner cavity to store the debris during use. At the base of the debris receptacle portion, a drill shank aperture is provided at the center of the bottom surface of the debris receptacle. A circular disc surrounds the circular perimeter drill shank aperture, and an anchor plate is embedded into the circular disc. The anchor plate in turn secures a disc shaped bearing to allow the drill bit to freely rotate while allowing the debris shield to stay in place during operation. The debris shield can be fitted with different types of drill bit shanks depending on the need and compatibility.

The debris shield's debris receptacle portion is made of flexible material that allows it to be compressed and reveal the drill bit as it drills a hole in the working surface. In the preferred embodiment, the debris shield can be pressed against a substantively flat working surface at an angle, allowing the debris shield to maintain contact and seal along the working surface and allowing a hole to be drilled at an angle. As the drill bit works its way into the hole and pressure being applied through the drill, the flexible debris shield compresses itself and conforms to the shape of the working surface, such that by the time the drill has fully made its way to the hole, the debris shield envelops the surface of the working area.

The debris shield can be made in different size in terms of the diameter of the debris receptacle and/or the depth of the debris receptacle.

BRIEF DESCRIPTION OF THE DRAWINGS

FIG. 16A depicts the conventional sized debris shield, while FIG. 16B depicts an alternate embodiment where the debris debris receptacle has a larger diameter but shallower debris receptacle depth.

REFERENCE NUMBER INDEX

100—Flexible drill shield
110—Debris receptacle
112—Outer wall
114—Debris receptacle lip
116—Drill shank aperture
118—Interior cavity
120—Ring
130—Rolling bearing element
140—Hub
200—Drill or other rotary tool
300—Drill bit
310—Drill bit shank
400—Work Area

DETAILED DESCRIPTION

Figure 1A:
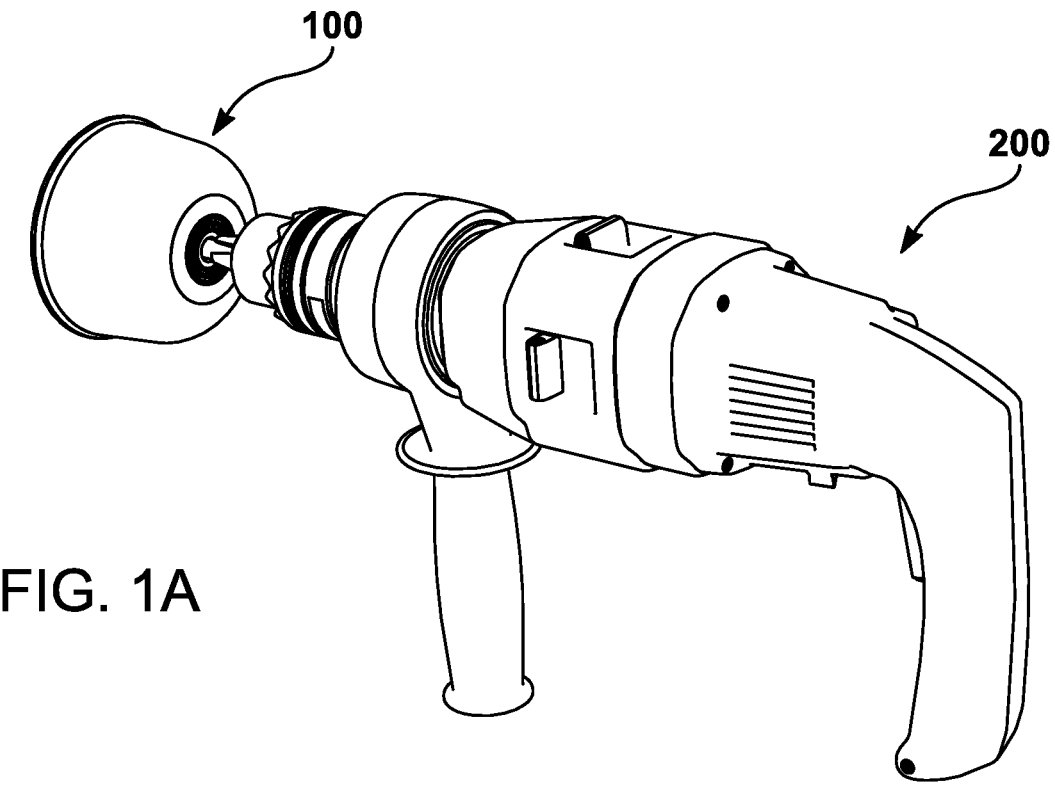
FIG. 1A is a perspective view of the flexible drill shield mounted on a typical hand-held power drill, with FIG. 1B showing an alternate perspective view of FIG. 1A.
Figure 1B:
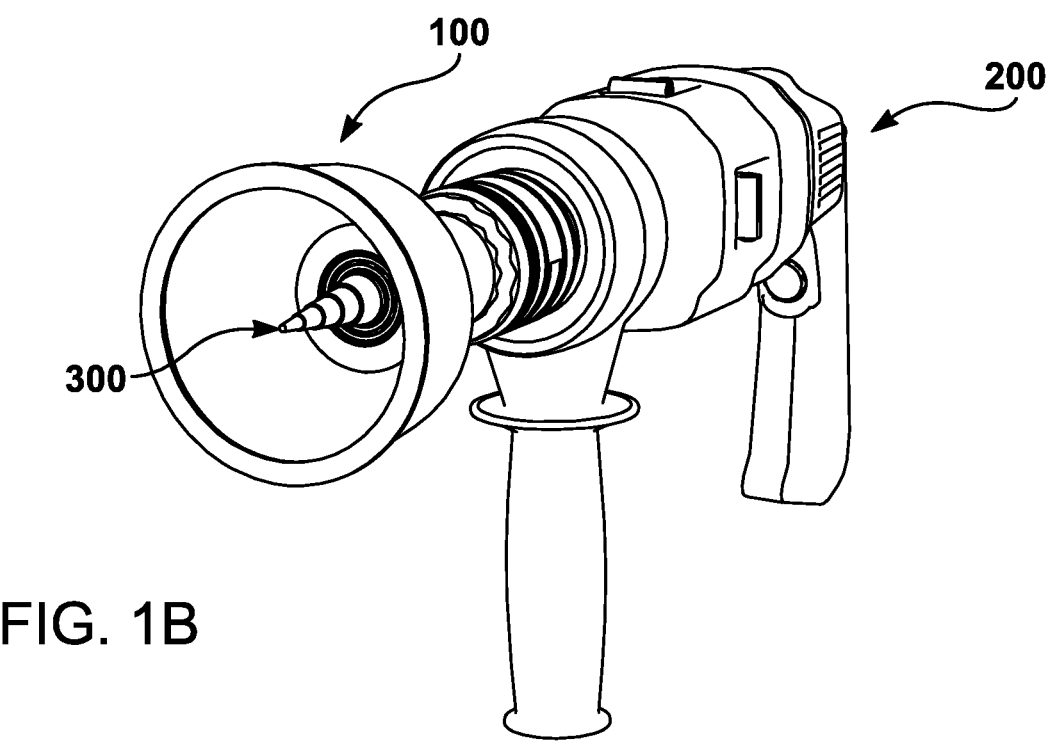

Looking at FIGS. 1A and 1B, the flexible debris shield 100 is attached to a hand-held drill 200 and secured by inserting the flexible debris shield into the drill bit 300 and attaching the drill bit into the hand-held drill 200.

Figure 2A:
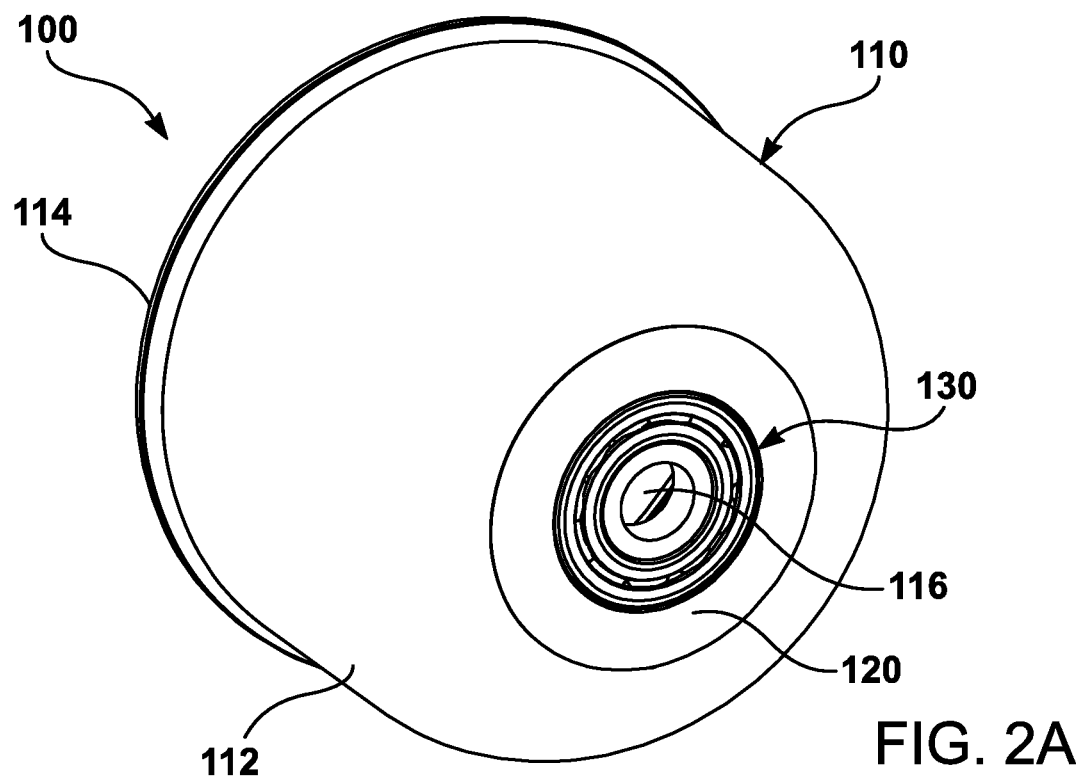
FIG. 2A is a perspective view of the flexible drill shield, with FIG. 2B depicting an alternate angle of the perspective view.
Figure 2B:
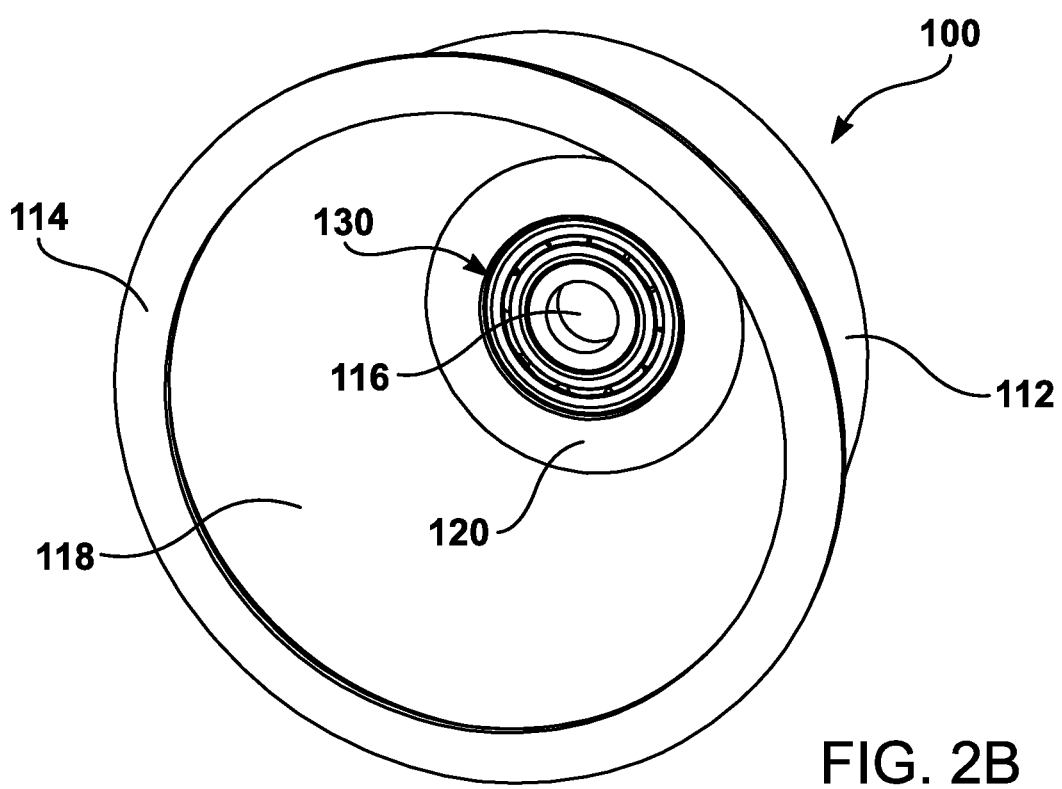

Looking at FIGS. 2A and 2B, the flexible debris shield 100 comprises of a debris receptacle portion 110, with the debris receptacle having an outer lip 114 that creates a seal when compressed to a working surface, a drill shank aperture 116 where a drill bit can be inserted and secure the debris shield to a hand-held drill. The debris receptacle portion has an outer wall portion 112, an inner cavity 118 to store the debris during use. At the base of the debris receptacle portion, a drill shank aperture 116 is provided at the center of the bottom surface of the debris receptacle. A ring 120 surrounds the circular perimeter drill shank aperture 116, and a hub 140 is embedded into the ring 120 portion of the debris receptacle 110. The hub 140 in turn secures a disc shaped rolling bearing element 130 to allow the drill bit to freely rotate while allowing the debris shield to stay in place during operation.

Figure 18:
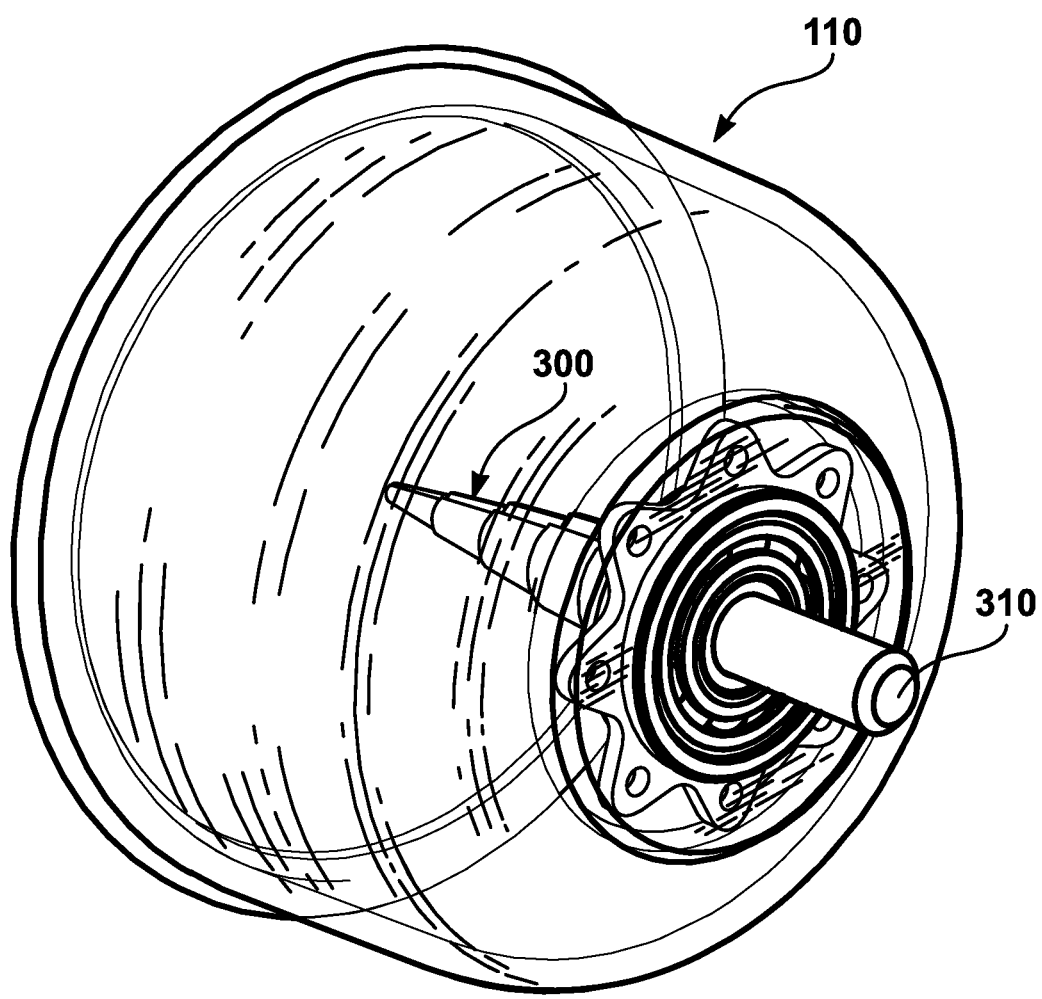
FIG. 18 shows the preferred embodiment where the debris receptacle is made out of a transparent, flexible material.

The debris receptacle 110 is made out of a flexible, transparent materials as seen in FIG. 18. In the preferred embodiment, the transparent material allows the user to see the drilling operation inside the debris shield.

The hub 140 is made of an injection molded plastic. In the preferred embodiment, the hub 140 is made using polycarbonate, but it can be made from a number of thermoplastics. The hub 140 can also be made out of metal part, as long as it is able to handle the heat of the molding process as well as the heat of the bearing in actual use. The hub 140 is insert molded during a secondary molding process to form the debris receptacle 110 so it becomes a single part. Materials were selected to have good adhesion so they do not separate with use. The shape of the hub is such that the leg portions provide more surface area and adhesion to the debris receptacle. The shape and holes in the hub 140 allow the molded debris receptacle to lock together as a single piece.

The debris receptacle lip 114 at the upper portion of the debris receptacle is provided to allow the debris receptacle's upper perimeter to form a tight seal with the surface of the work area. The debris receptacle's lip is also important to give the debris receptacle adequate support during use so that the body of the debris receptacle compresses along the perpendicular plane of the debris receptacle's base as seen in FIGS. 8-15. Without a sufficient lip surface area, the debris receptacle may compress and/or crumple unpredictably and may interfere with drilling operations when the debris receptacle is compressed.

Figure 3A:
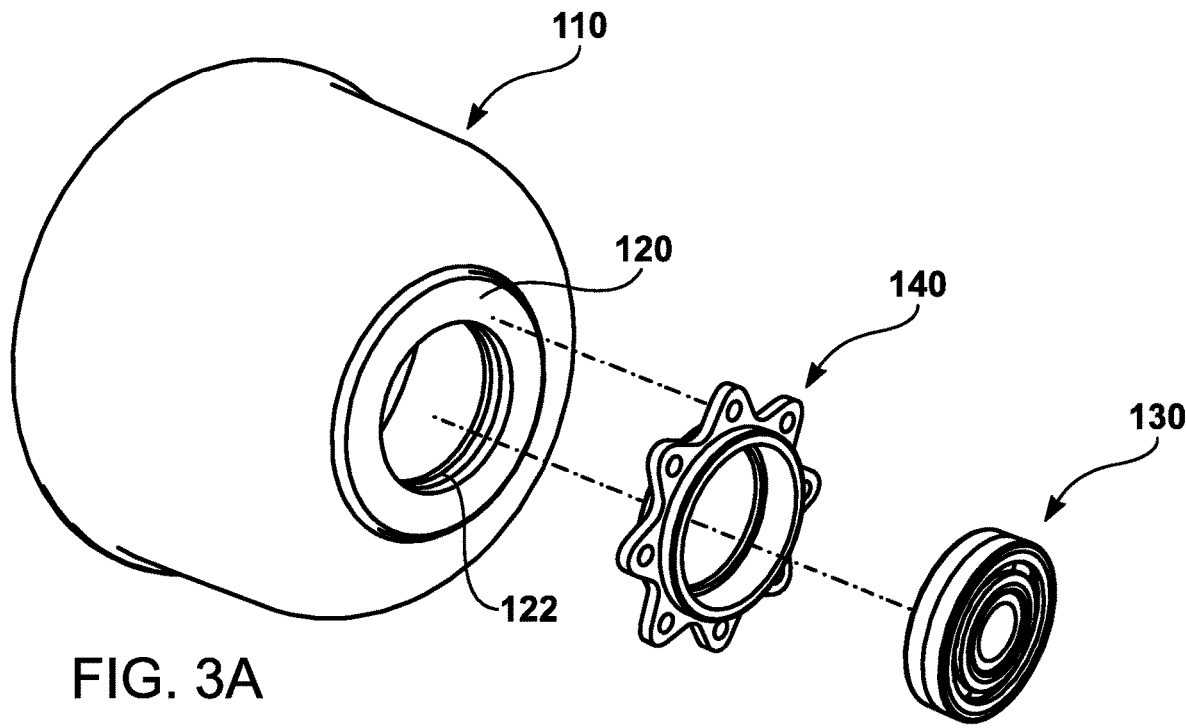
FIG. 3A is an exploded view of the flexible drill shield showing all the components, with FIG. 3B depicting an alternate angle of the exploded view.
Figure 3B:
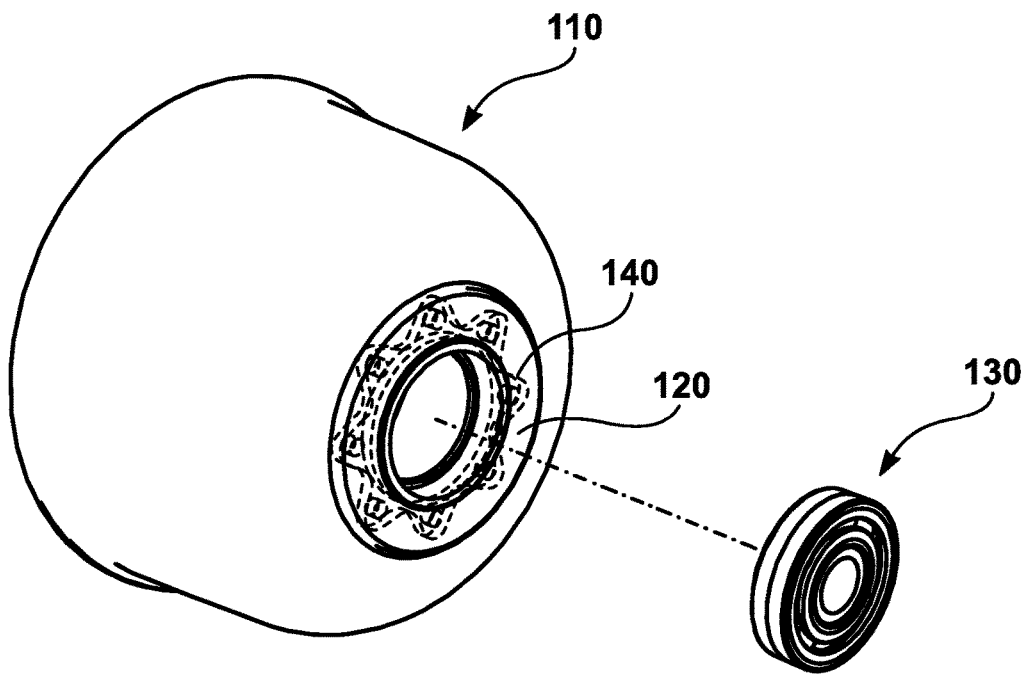

FIGS. 3A and 3B depict the exploded view of the debris shield, although this does not indicate that they can be necessarily disassembled. In the preferred embodiment, all the components are integrated together so there are no removable parts to ensure safety during use.

Figure 4A:
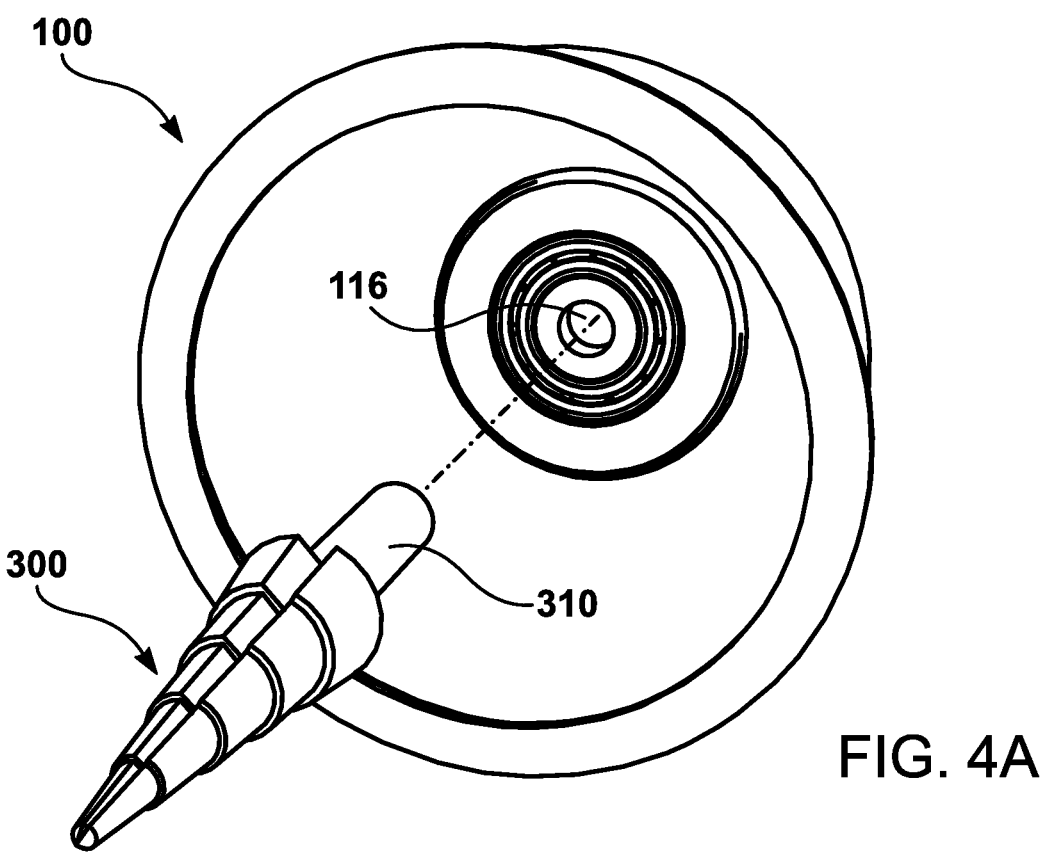
FIGS. 4A, 4B. 5A, 5B, 6A, 6B, 7A, and 7B depict the flexible drill shield being fitted with different types of drill bits and drill bit shanks.
Figure 4B:
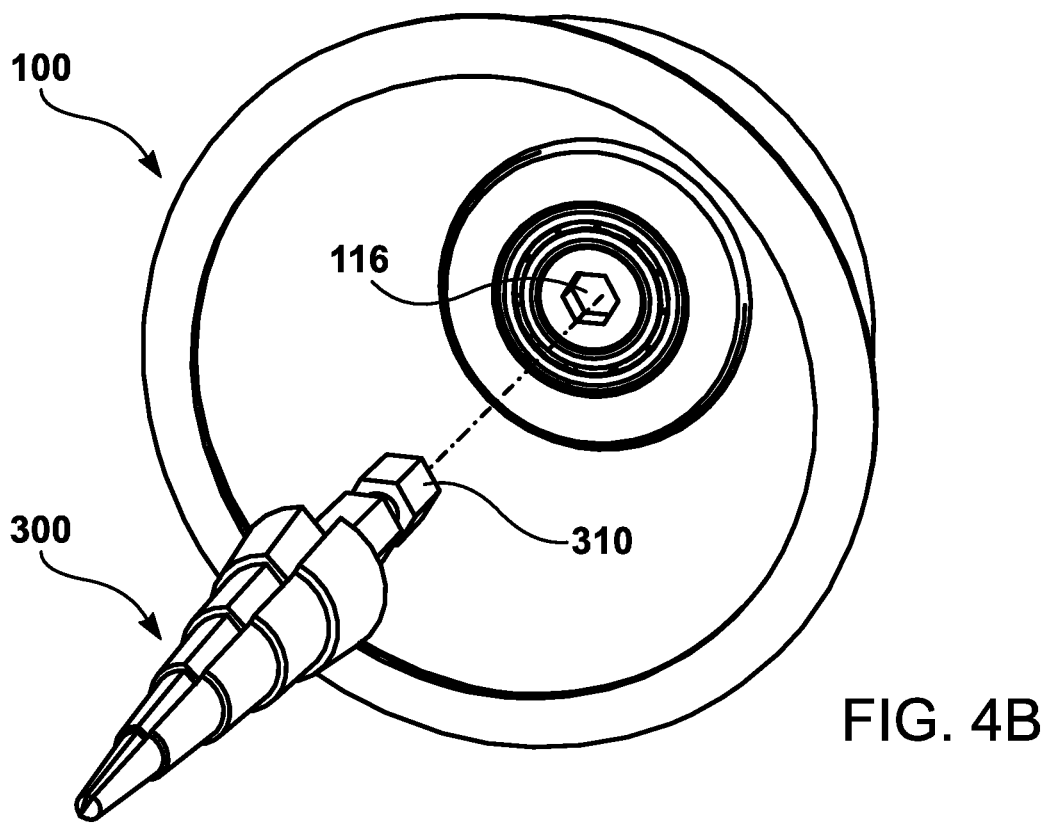
Figure 5A:
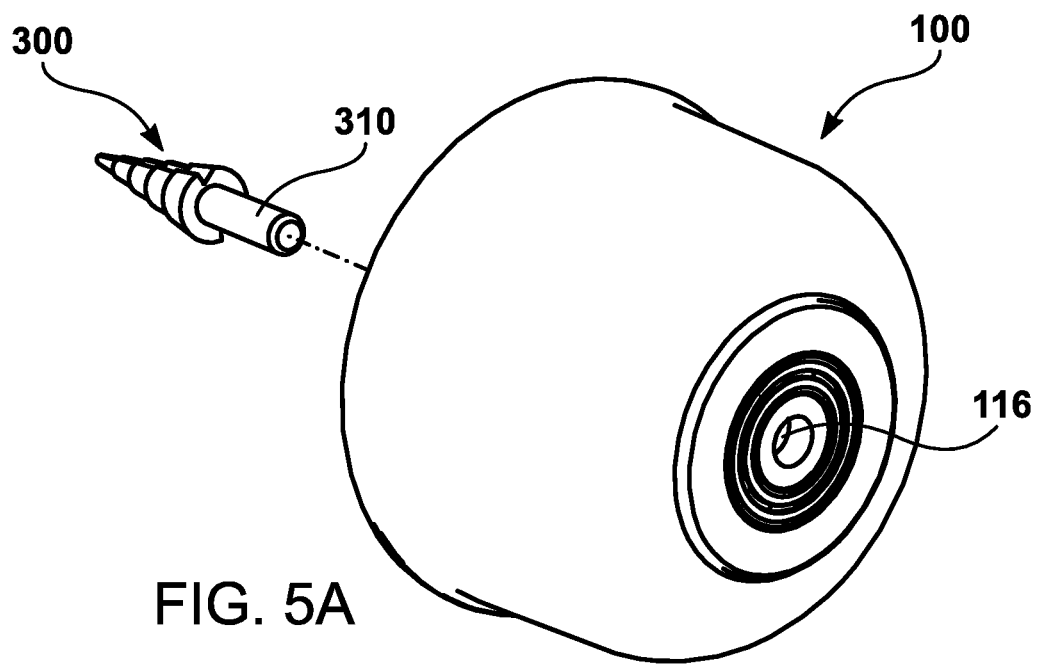
Figure 5B:
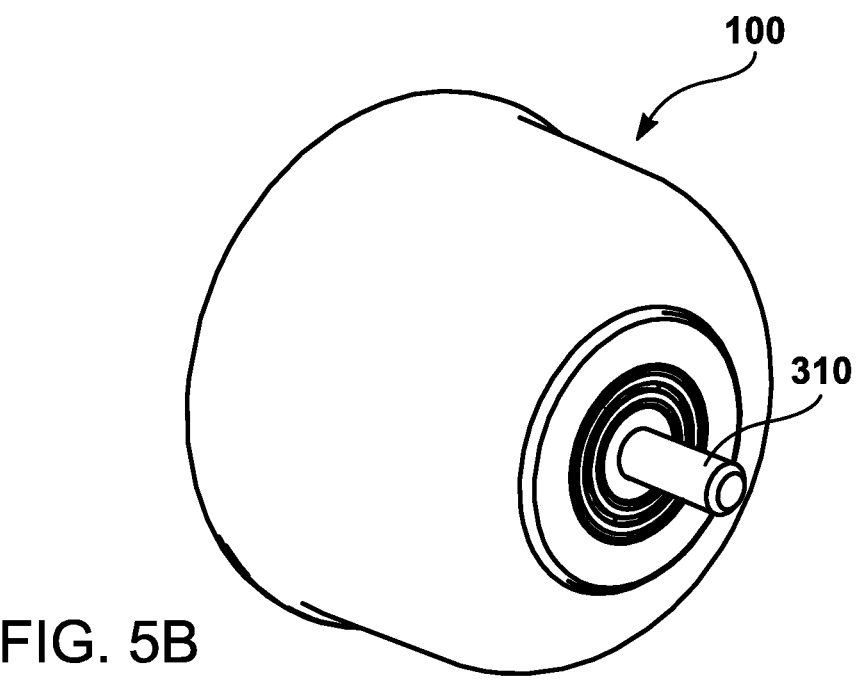
Figure 6A:
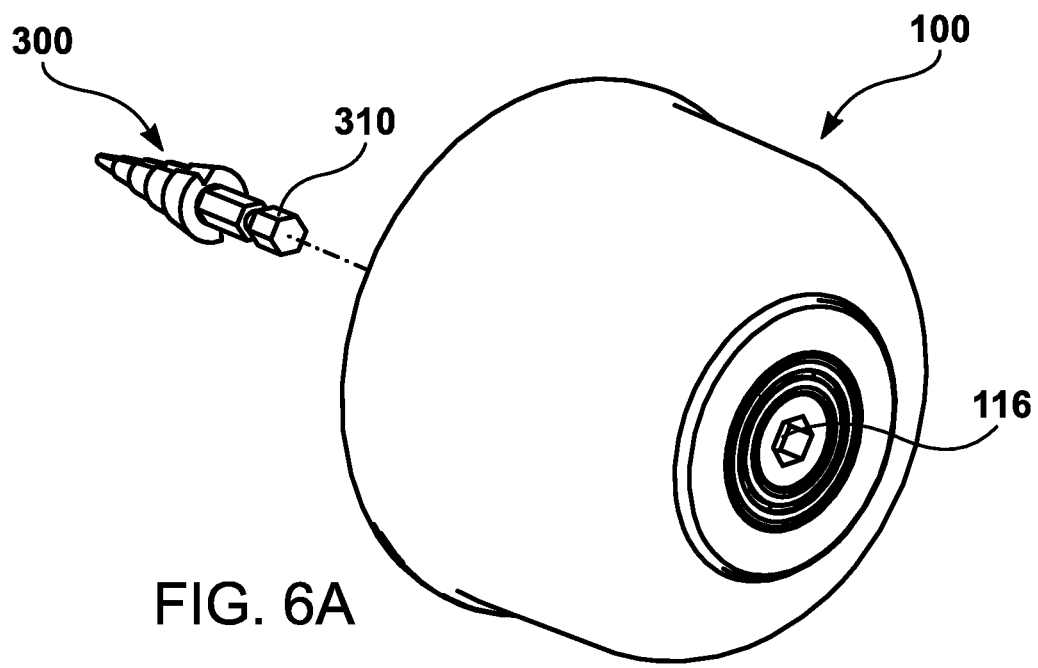
Figure 6B:
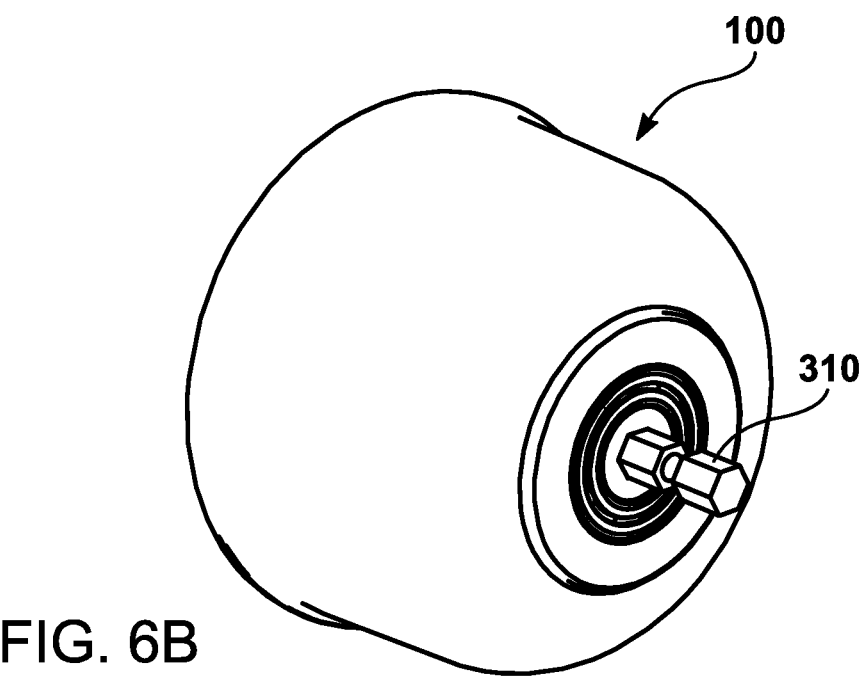
Figure 7A:
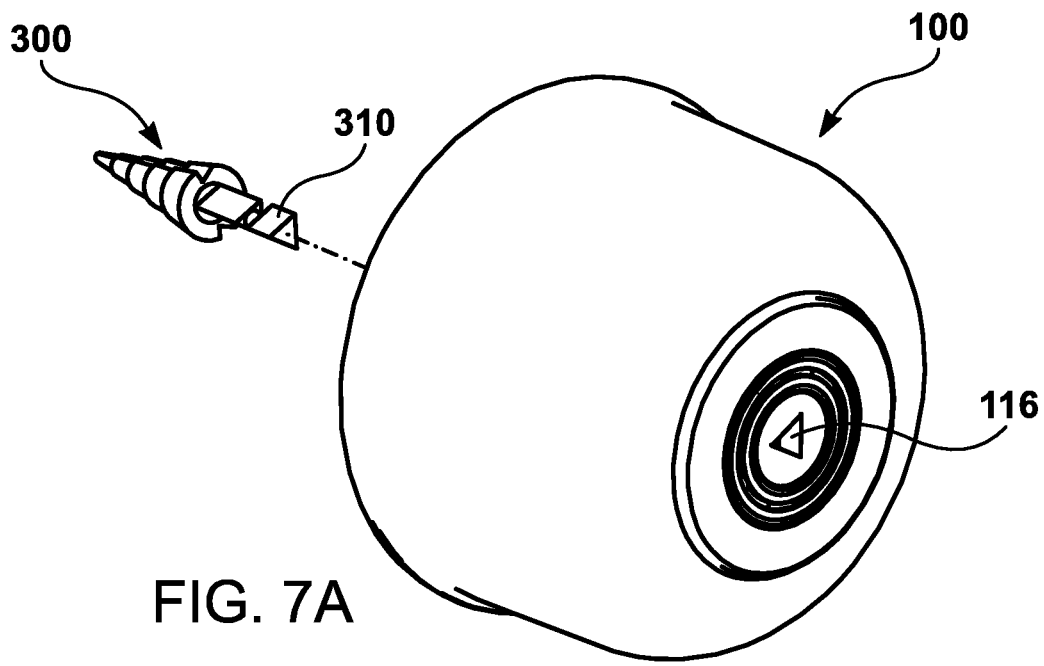
Figure 7B:
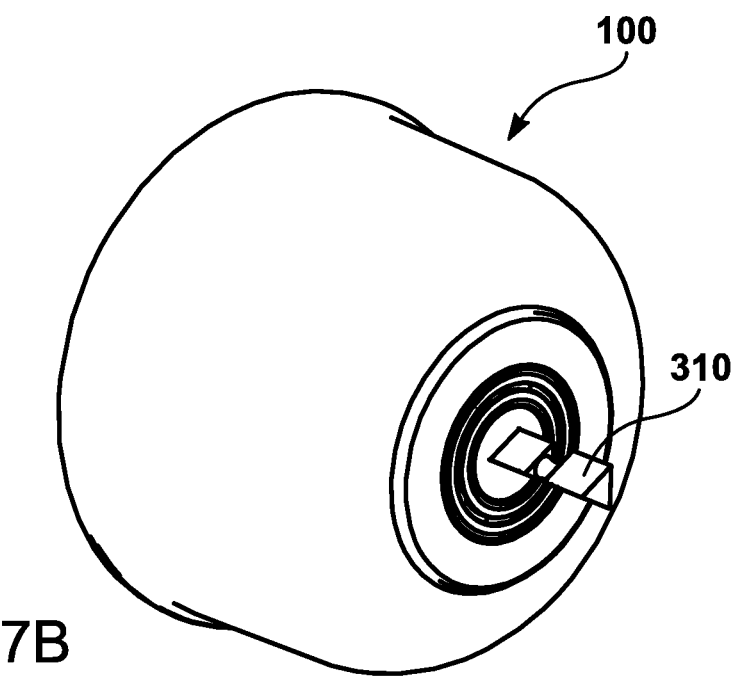

FIGS. 4A, 4B. 5A, 5B, 6A, 6B, 7A, and 7B, the debris shield can be fitted with different types of drill bit shanks depending on the need and compatibility. The shield is inserted to the bit shank, and the bit shank in turn is inserted to the chuck of the drill such that the shield is secured and not loose during use.

Figure 8A:
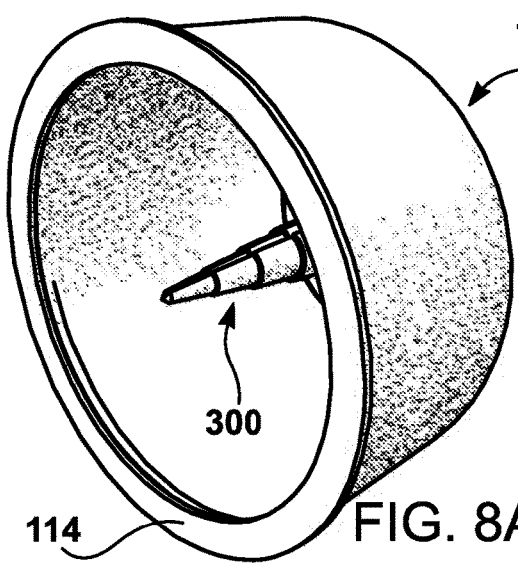
FIGS. 8A, 8B, and 8C, the debris shield is shown in its default/relaxed state.
Figure 9A:
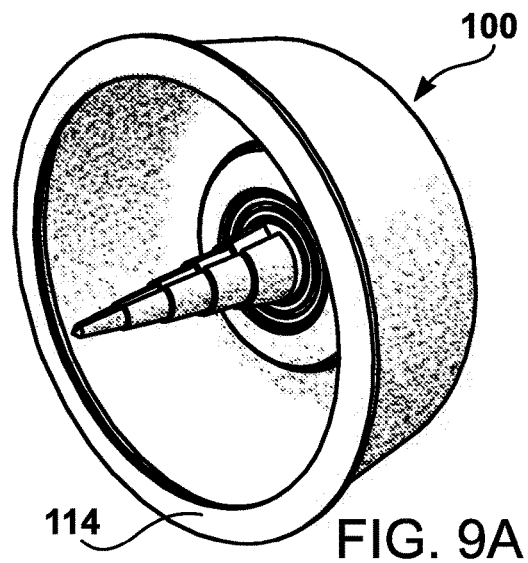
FIGS. 9A, 9B, 9C depict the debris shield in its compressed state as a user applies pressure along the hand drill toward the working surface area such that the debris receptacle is pressed against the working surface area and gradually compresses as the drill works its way into the wall.
Figure 8B:
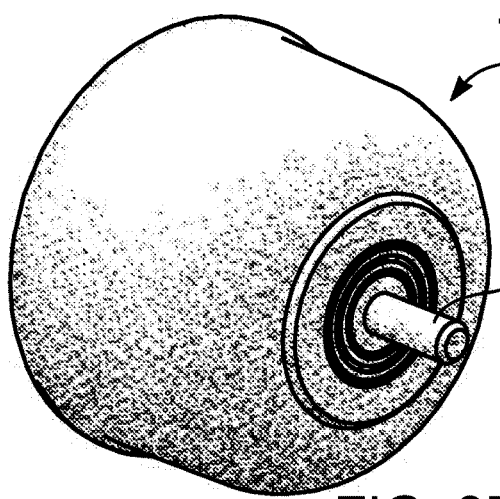
Figure 9B:
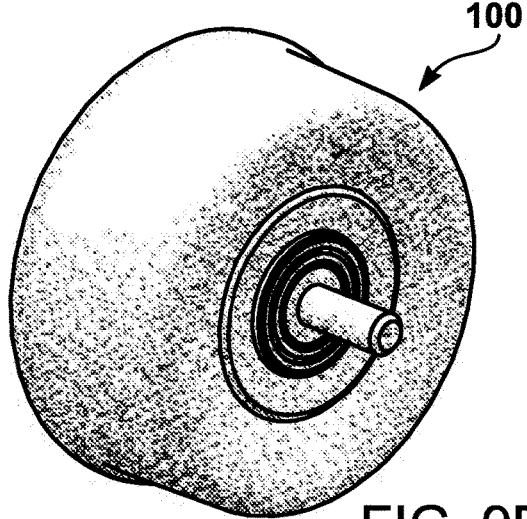
Figure 8C:
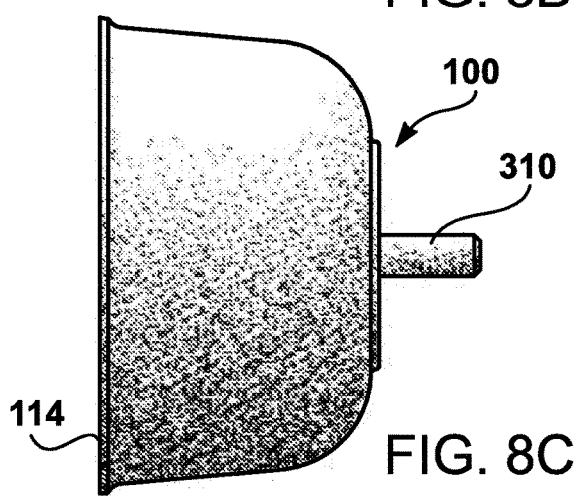
Figure 9C:
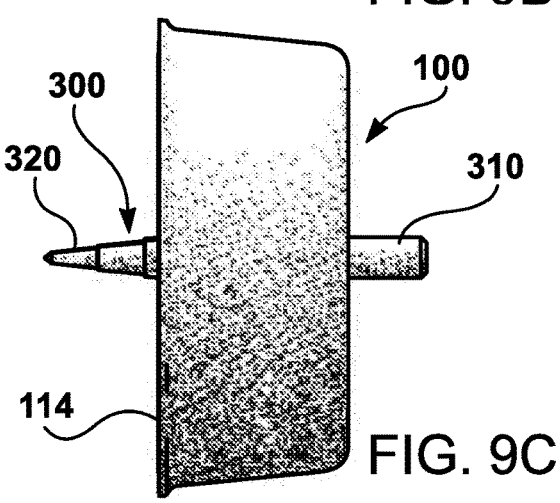
Figure 10A:
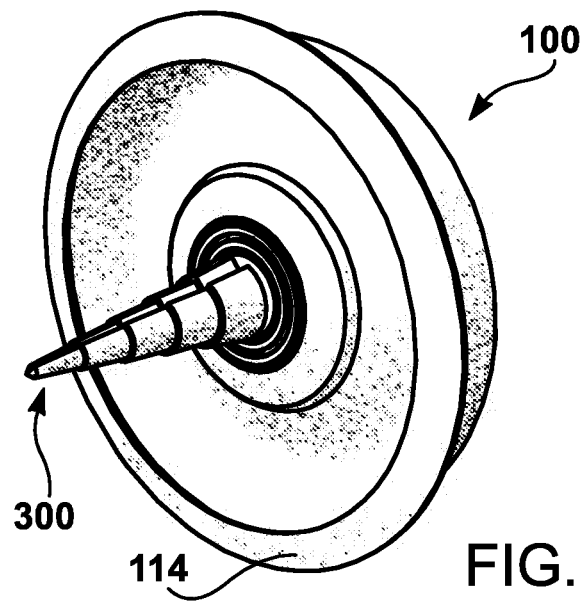
FIGS. 10A and 10B depict the debris receptacle being fully compressed, with the lip being pressed fully against the working surface to allow the drill bit to completely drill its way through the hole.
Figure 10B:
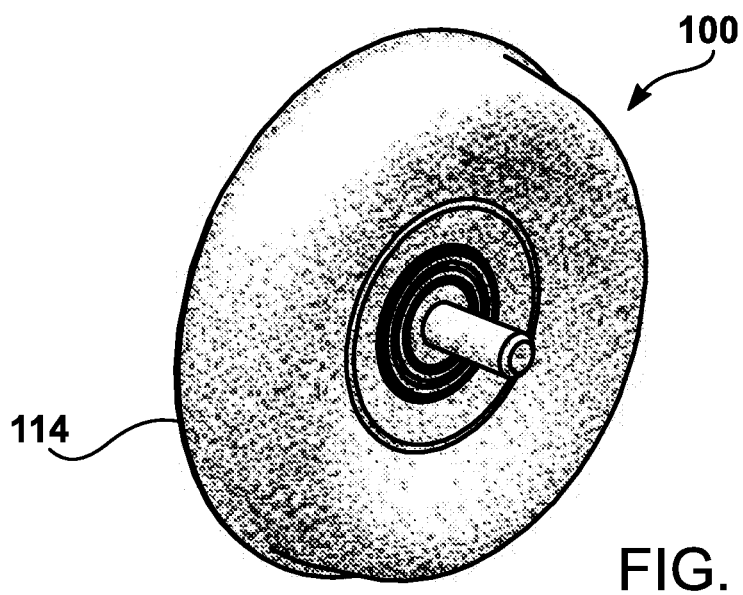

Looking at FIGS. 8A, 8B, and 8C, the debris shield is shown in its default/relaxed state. FIGS. 9A, 9B, 9C depict the debris shield in its compressed state as a user applies pressure along the hand drill toward the working surface area such that the debris receptacle is pressed against the working surface area and gradually compresses as the drill works its way into the wall. FIGS. 10A and 10B depict the debris receptacle being fully compressed, with the lip 114 pressed fully against the working surface to allow the drill bit to completely drill its way through the hole.

The surface of the lip may be made of a material with high gripping property so that it minimizes slipping during use.

Figure 11A:
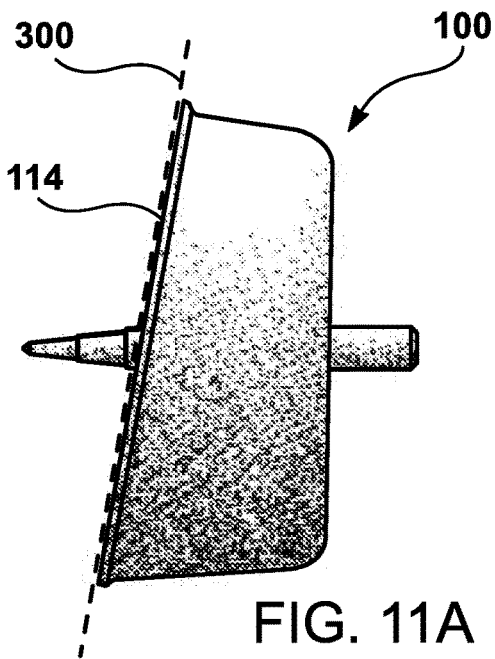
FIGS. 11A and 11B show the debris shield being pressed against a substantively flat working surface at an angle, allowing the debris shield to maintain contact and seal along the working surface and allowing a hole to be drilled at an angle.
Figure 11B:
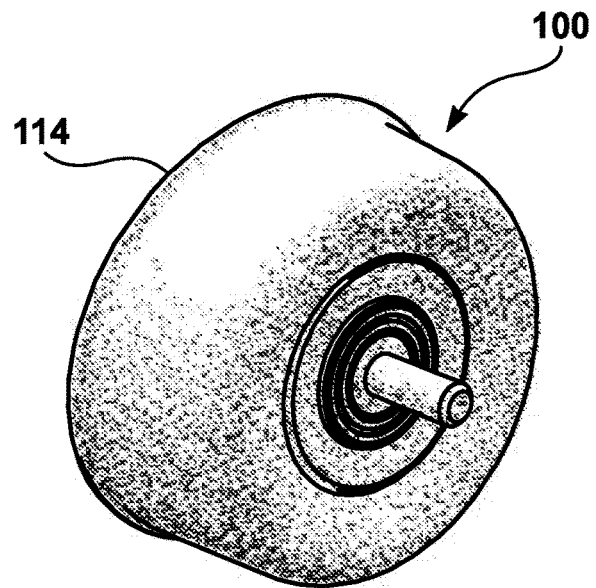
Figure 12A:
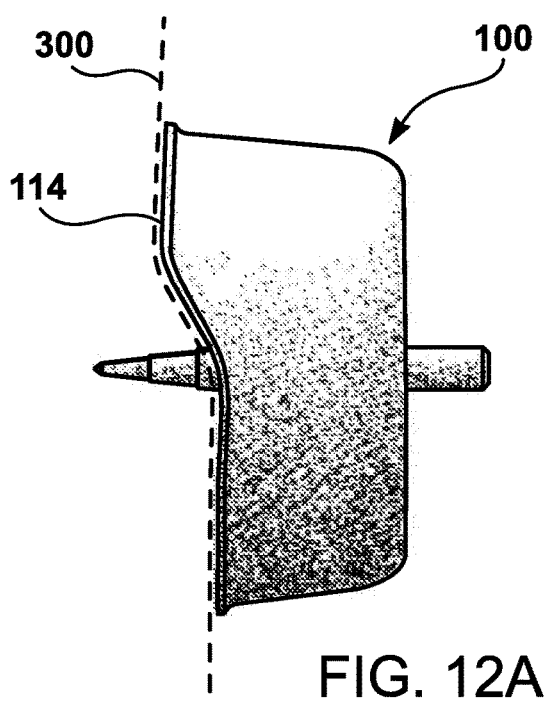
FIGS. 12A and 12B depict the debris shield being pressed against an uneven surface, where the debris receptacle portion of the shield has the flexibility to compress and contort its shape to allow substantive seal to form between the lip and the working surface.
Figure 12B:
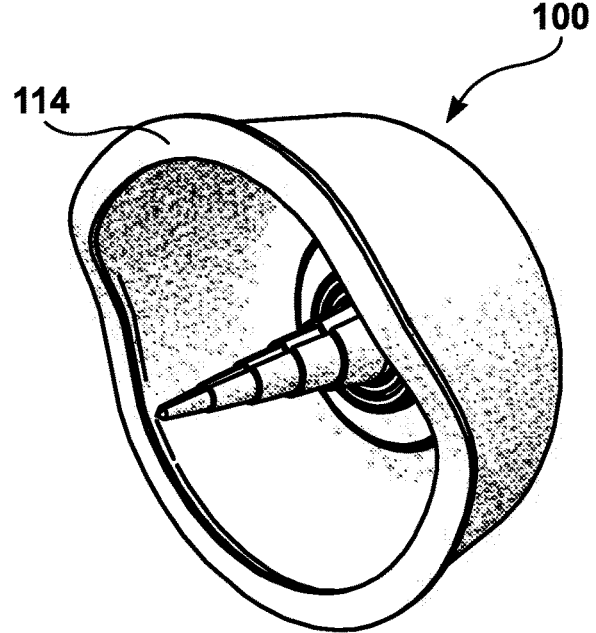
Figure 13A:
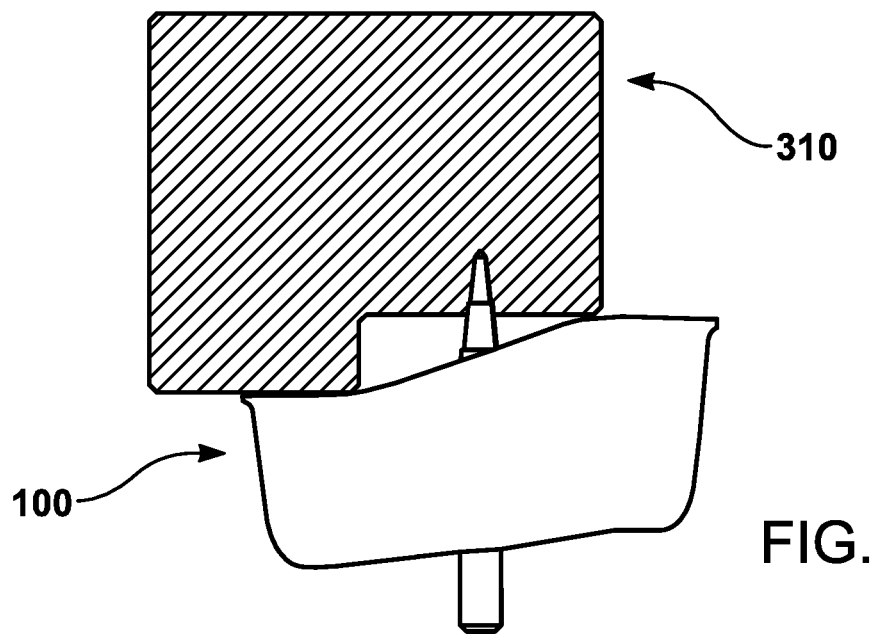
FIGS. 13A, 13B, 14A, 14B, 15A, and 15B further depict the debris shield compressed against an uneven working space.
Figure 13B:
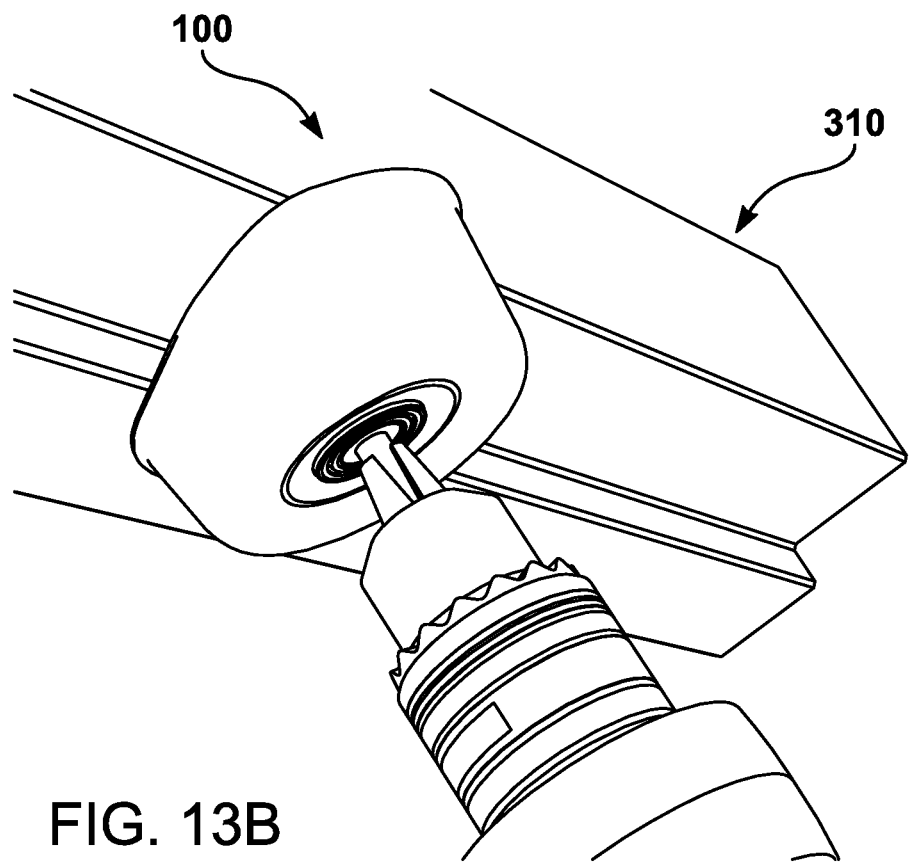
Figure 14A:
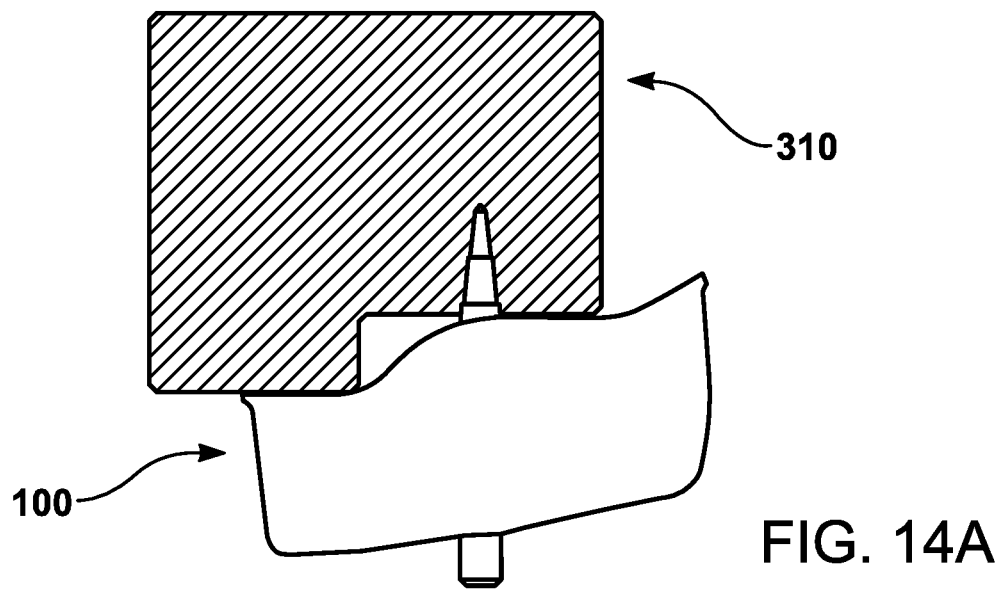
Figure 14B:
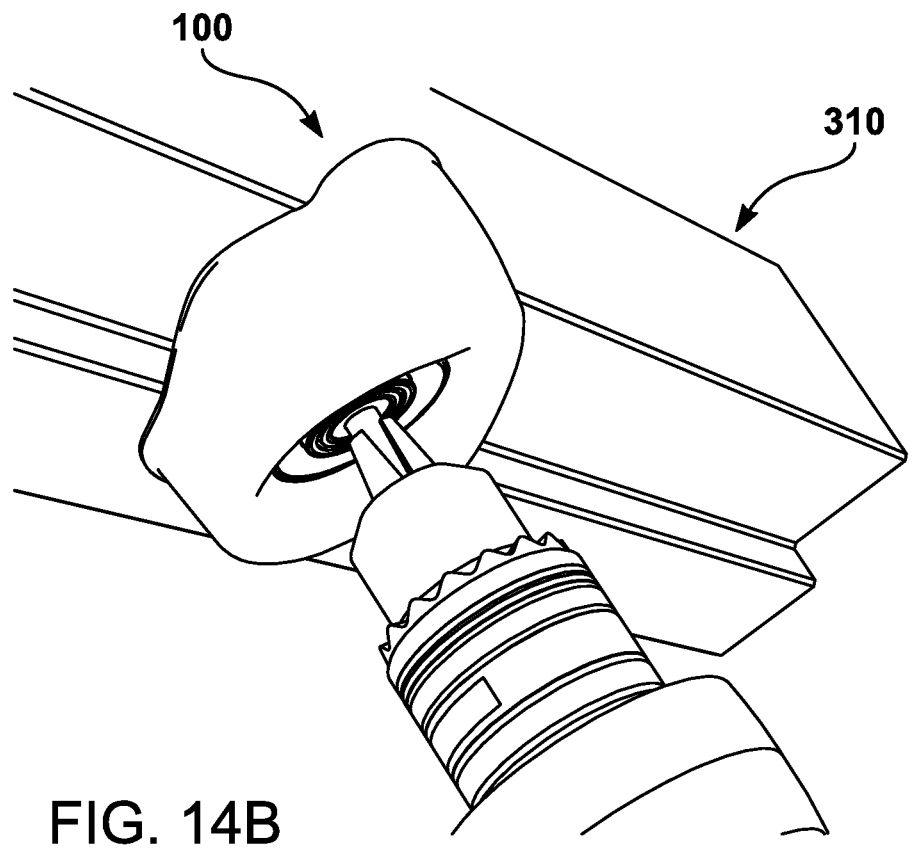
Figure 15A:
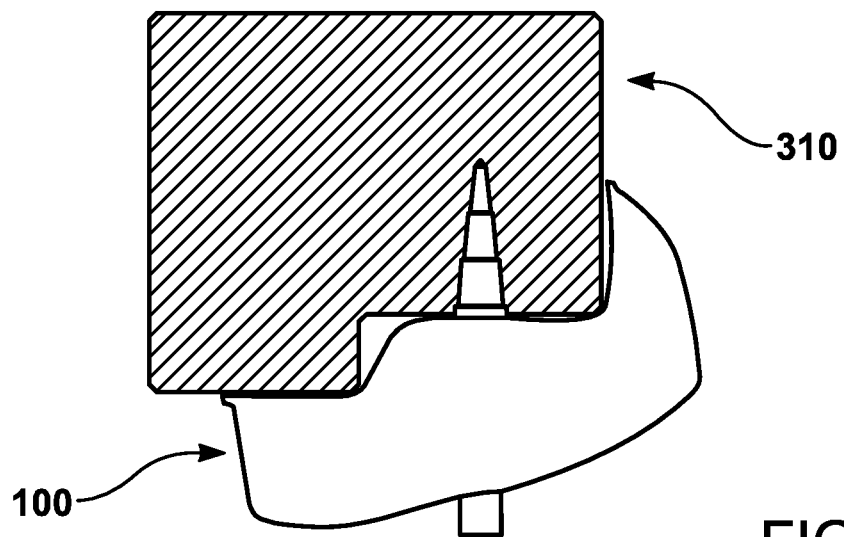
Figure 15B:
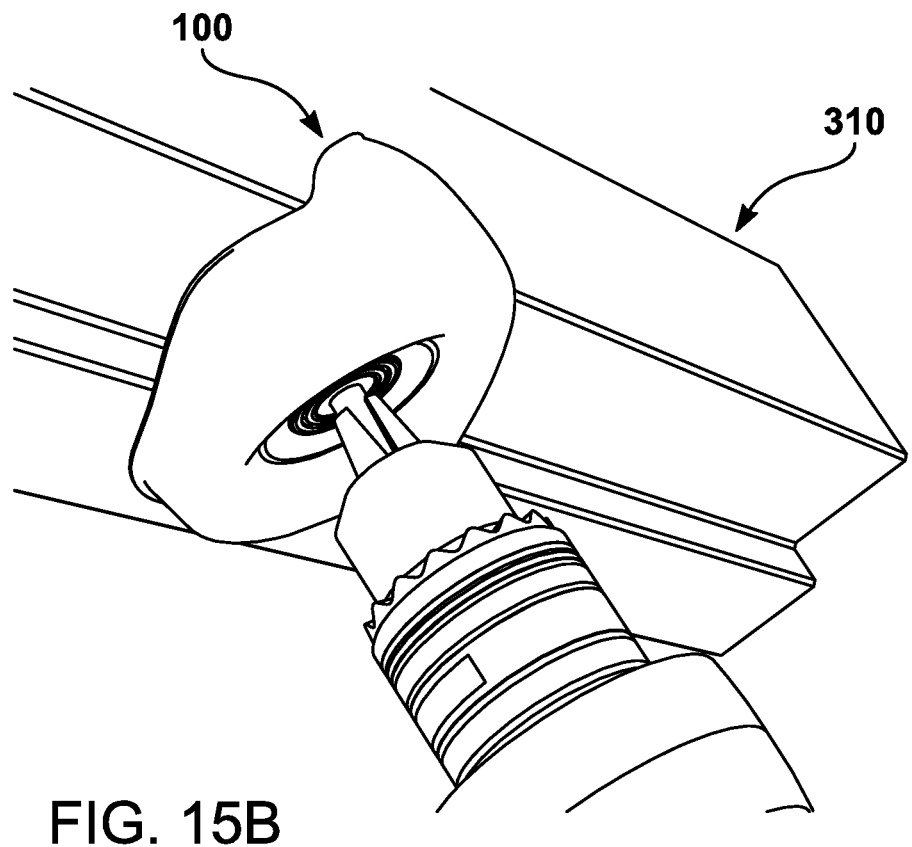

Looking at FIGS. 11A and 11B, the debris shield can be pressed against a substantively flat working surface at an angle, allowing the debris shield to maintain contact and seal along the working surface and allowing a hole to be drilled at an angle. FIGS. 12A and 12B depict the debris shield 100 being pressed against an uneven surface, where the debris receptacle portion of the shield has the flexibility to compress and contort its shape to allow substantive seal to form between the lip 114 and the working surface. FIGS. 13A, 13B, 14A, 14B, 15A, and 15B further depict the debris shield compressed against an uneven working space. As the drill bit works its way into the hole and pressure being applied through the drill, the flexible debris shield 100 compresses itself and conforms to the shape of the working surface, such that by the time the drill has fully made its way to the hole, the debris shield envelops the surface of the working area as seen on FIGS. 15A and 15B.

Figure 16A:
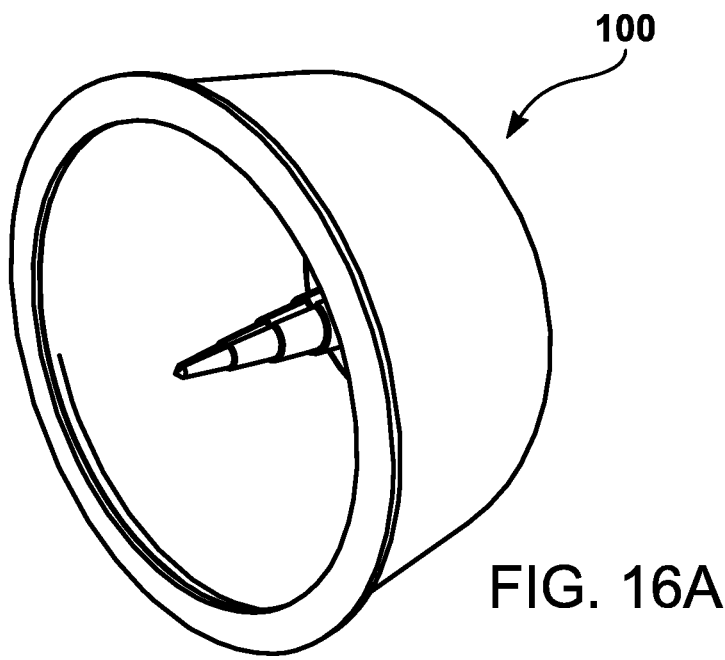
FIGS. 16A and 16B, the debris shield can be made in different size in terms of the diameter of the debris receptacle and/or the depth of the debris receptacle.
Figure 16B:
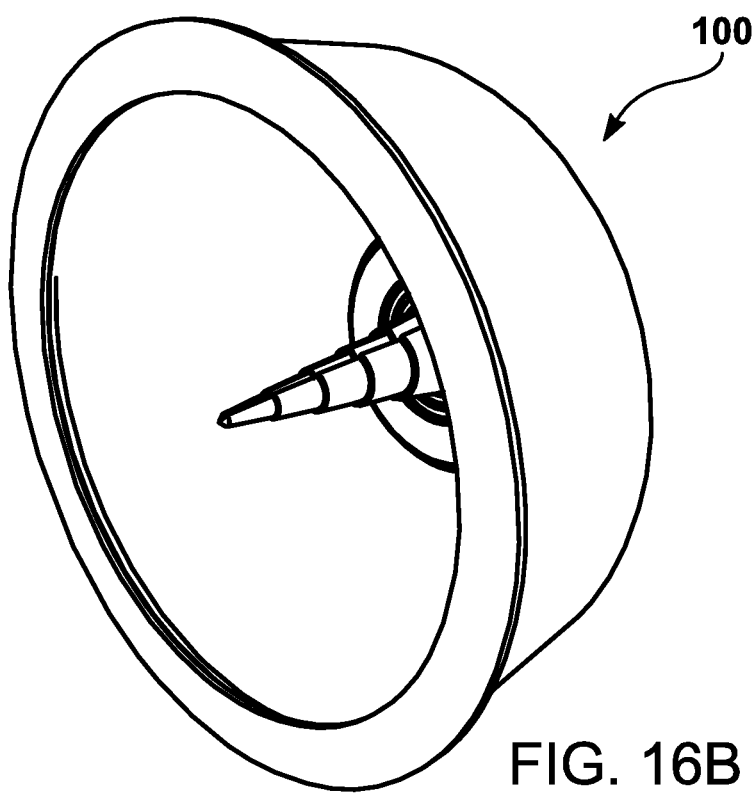

Looking at FIGS. 16A and 16B, the debris shield can be made in different size in terms of the diameter of the debris receptacle and/or the depth of the debris receptacle. FIG. 16A depicts the conventional sized debris shield 100, while FIG. 16B depicts an alternate embodiment where the debris debris receptacle has a larger diameter but shallower debris receptacle depth.

Figure 17A:
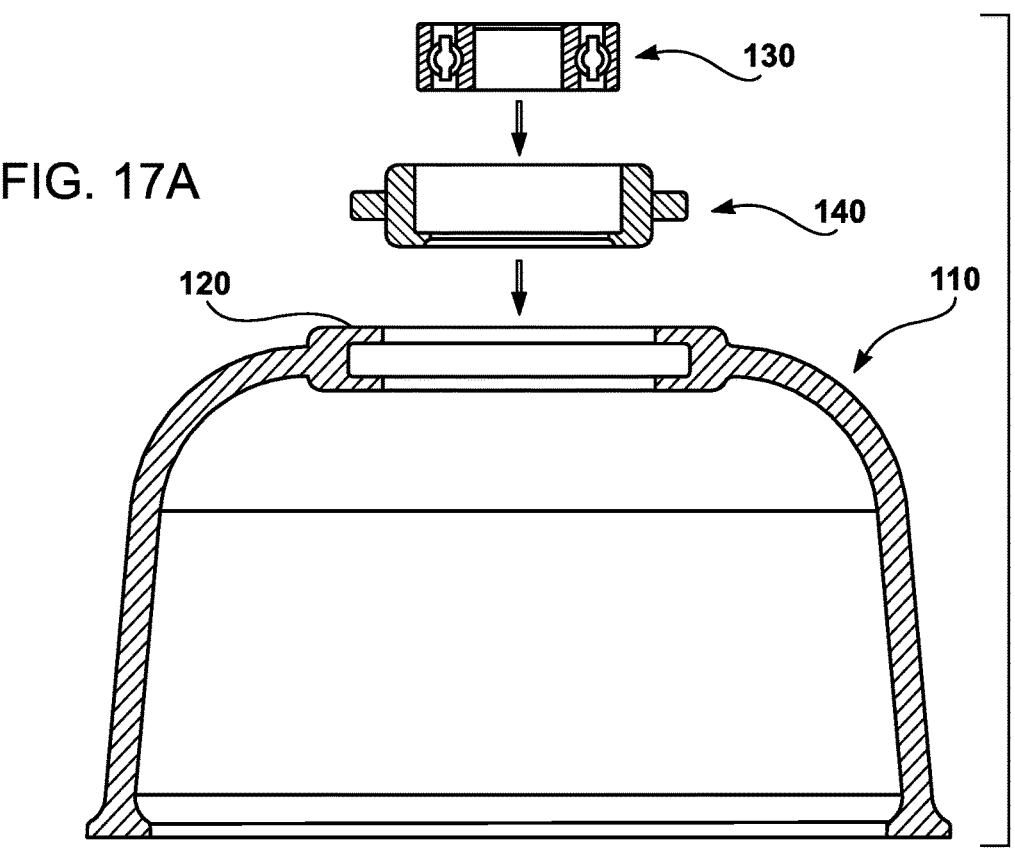
FIGS. 17A and 17B depict cross-sectional views of the flexible debris shield showing how the ball bearings, the hub, and the debris receptacle are molded together as a single unit.
Figure 17B:
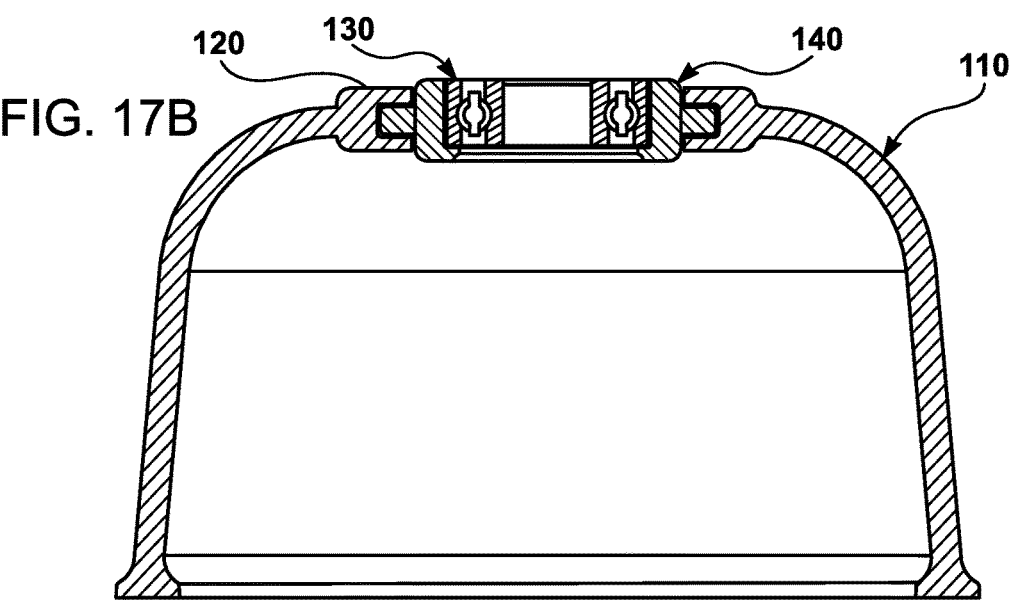

FIGS. 17A and 17B depict cross-sectional views of the flexible debris shield showing how the ball bearings 130, the hub 140, and the debris receptacle 110 are molded together as a single unit.

I claim:

1. A flexible attachable debris shield for mounting to a rotatable drill shank, comprising:
   a bowl-shaped debris receptacle made of flexible material having a lip around a rim of said bowl-shaped debris receptacle; wherein the rim is capable, due to the flexible material, of conforming with an uneven work surface;
   said bowl-shaped debris receptacle having a bottom surface opposite said rim, an outer wall connecting said rim and said bottom surface, a ring defining a central aperture, an inner peripheral surface of the ring defining an annular slot;
   a star-shaped hub having an annular base body and a plurality of leg portions protruding from the annular base body, each of the plurality of leg portions has a hole, the star-shaped hub is inside the central aperture of the ring, the plurality of leg portions located entirely within the annular slot, wherein the star-shaped hub and the flexible material are configured for being locked together as a single piece due to each hole and the plurality of leg portions; and
   a rolling bearing element inside the star-shaped hub, the rolling bearing element defining a drill shank aperture at a center of said bottom surface, the drill shank aperture having a circular inner perimeter.

2. The flexible attachable debris shield of claim 1, wherein the debris receptacle is made of a transparent flexible material.

3. The flexible attachable debris shield of claim 1, wherein the bowl-shaped debris receptacle is deep enough to hold debris from a hole being drilled.

4. The flexible attachable debris shield of claim 1, wherein the lip is made of a material to minimize slipping during use when said rim is pressed against an underlying work surface.

5. The flexible attachable debris shield of claim 4, wherein the lip is configured to minimize slipping of the debris shield when contacting the uneven work surface.

6. The flexible attachable debris shield of claim 1, wherein the bowl-shaped debris receptacle is configured to contain debris by substantially enveloping a work surface narrower in dimension than a diameter of the lip.

7. The flexible attachable debris shield of claim 1, wherein the star-shaped hub is made from a material selected from the group consisting of injection molded plastic and metal.

8. The flexible attachable debris shield of claim 1, the rolling bearing element having an inner race and an outer race, the inner race making direct contact with an inserted drill shank.

* * * * *